(12) United States Patent
Bitbaba et al.

(10) Patent No.: US 6,217,137 B1
(45) Date of Patent: Apr. 17, 2001

(54) HINGE FOR CONNECTION OF PLASTIC MOLDING

(75) Inventors: Rishard Bitbaba, Modesto; Roy Bragadeste, San Diego, both of CA (US)

(73) Assignees: Sony Electronics, Inc., Park Ridge, NJ (US); Sony Corporation, Tokyo (JP)

( * ) Notice: Subject to any disclaimer, the term of this patent is extended or adjusted under 35 U.S.C. 154(b) by 0 days.

(21) Appl. No.: 09/023,697

(22) Filed: Feb. 13, 1998

(51) Int. Cl.[7] ........................................... A47B 97/00
(52) U.S. Cl. ..................... 312/223.1; 348/825; 248/917
(58) Field of Search ....................... 312/223.1, 223.2, 312/293.2, 265.6, 7.2; 348/825, 826, 827, 836; 248/371, 921, 922, 923, 917; 220/4.21, 4.22, 4.23, 327, 324, 835, 836, 840

(56) References Cited

U.S. PATENT DOCUMENTS

| | | | |
|---|---|---|---|
| 3,968,921 | * | 7/1976 | Jewell ............................... 220/836 X |
| 4,431,114 | * | 2/1984 | Kleinfeld ........................... 220/836 X |
| 4,554,590 | * | 11/1985 | Chelin et al. ......................... 348/827 |
| 4,645,153 | * | 2/1987 | Granzow et al. ................. 248/921 X |
| 4,741,032 | * | 4/1988 | Hampton ......................... 220/836 X |
| 4,820,224 | * | 4/1989 | Lemche ............................ 348/825 X |
| 5,033,802 | * | 7/1991 | Fairbanks ........................ 348/836 X |
| 5,197,789 | * | 3/1993 | Lin ..................................... 312/223.2 |
| 5,522,163 | * | 6/1996 | Neugebauer ....................... 40/661 X |
| 5,582,470 | * | 12/1996 | Yu ................................. 312/223.1 X |
| 5,632,463 | * | 5/1997 | Sung et al. ....................... 248/921 X |
| 5,838,540 | * | 11/1998 | Wen-Shyong ................. 312/223.2 X |
| 5,947,440 | * | 9/1999 | Cho ................................. 248/917 X |

* cited by examiner

Primary Examiner—James O. Hansen
(74) Attorney, Agent, or Firm—Ronald P. Kananen; Rader, Fishman & Grauer

(57) ABSTRACT

A housing for protection and containment of electrical components, includes a cover, having at least one hinge hook, and no more than two securing receivers; a main body, in which the electrical components are to be enclosed by the cover, having no more than two securing receivers, and a receiver for each of the hinge hooks; and no more than two securers, such as screws, received by the securing receivers.

13 Claims, 4 Drawing Sheets

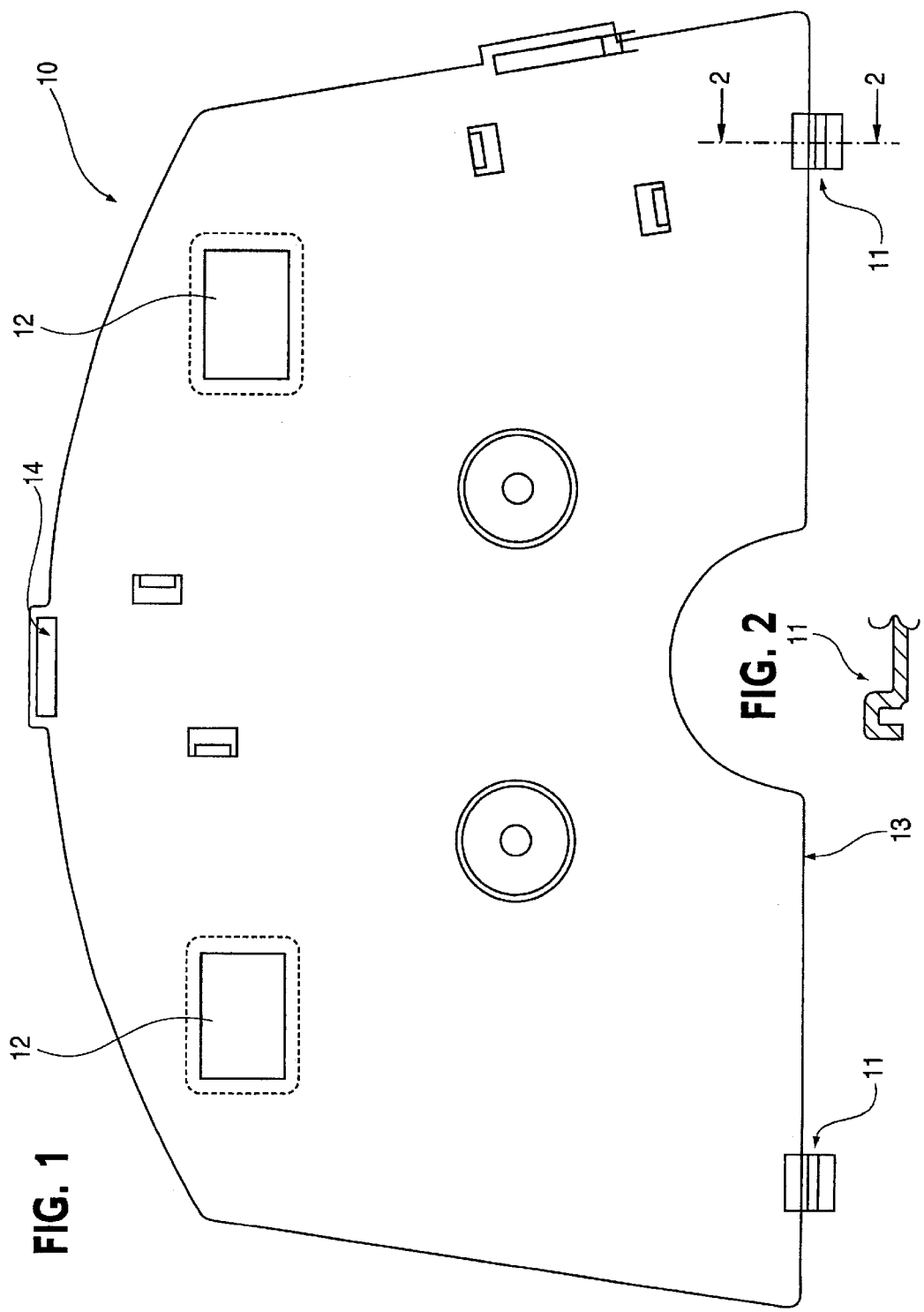

HINGE FOR CONNECTION OF PLASTIC MOLDING

BACKGROUND OF THE INVENTION

This invention is used in the field of plastic molding used to cover electrical components. Specifically, the present invention is used in the field of plastic molding used as a base stand for a computer terminal, or other terminal. The present invention is directed toward the problems of inefficient production and assembly of terminal base stands. More specifically, the present invention overcomes the problems of inefficiency and high costs when using numerous screws, or snaps to fit plastic molding components together during assembly of a base stand.

Manufacture of interconnected plastic molding to serve as a housing or cover for sensitive components can be frustrating for the worker due to the tremendous amount of time it can take to fit and secure pieces of molding together. The housing protects electrical components from exposure to dirt, liquid, or other things that are harmful to delicate circuitry. The housing also covers unsightly circuitry from the user's view. The housing must therefore be cosmetically appealing, and sturdy. Because of the need for these attributes, the plastic molding parts are attached with numerous screws in out of sight, and often difficult to reach places. Thus, difficulties for the assembler are common.

Because the housing is used to cover electrical components, the housing is often exposed to vibrations. When screws are used as securers for plastic molding pieces, vibrations can loosen the screws over an extended period of time. It is therefore an object of the present invention to overcome the problem of eventually loosened plastic molding pieces due to vibrations of electrical equipment.

Another problem that occurs when using screws as securers is the excessive amount of time that it takes to assemble the plastic pieces together. The larger the pieces to be secured together, the more screws that are required, and the more work that needs to be done by the assembler. The excessive amount of work is frustrating for the person assembling the computer terminal base or other plastic housing. It is therefore another object of the present invention to provide plastic molding that is quickly assembled with few securing parts.

SUMMARY OF THE INVENTION

The above-described objects and others are met by a housing for protection and containment of electrical components. The housing includes a cover that has at least one hinge hook, and no more than two securing receivers. In a preferred embodiment of the invention, the hinge hook is located on an outer edge of a surface of the cover.

The housing also includes a main body, in which the electrical components are to be enclosed. The main body can be a plastic base stand for a computer monitor. The main body has no more than two securing receivers, like the cover, and a receiver for each of the hinge hooks. When the hinge hooks are in place with the hinge receivers, the securing receivers in the cover automatically align with the securing receivers in the main body.

The housing also includes no more than two securers, received by the first and second securing receivers. The securers can be screws or equivalent fasteners, and the first and second securing receivers can be bosses for said screws or equivalent fasteners. Because of the unique usage of a hinge mechanism in the present invention, the maximum number of required screws and bosses are greatly reduced in comparison with the prior art. There can even be less than two screws and bosses to securely fasten the cover against the main body.

In another embodiment of the invention, a securing clip is mounted on the cover, which can be fastened in a slot formed in the main body when the hinges are engaged with the hinge slots. In such an embodiment, the number of screw required to securely fasten the cover to the main body can be one, or even zero. In this embodiment, the means for snapping the cover against the main body are not limited to a clip and slot. Other equivalent mechanisms for the same purpose can be readily adapted to protect the electrical boards and other electrical equipment to be housed within the main body.

The above-described needs are also met by a method for housing electrical components located in a computer terminal base stand, including the steps of providing a cover, including at least one hinge hook, and no more than two securing receivers; providing a main body, which contains the electrical components to be protected, including no more than two securing receivers, and at least one receiver corresponding to the provided hinge hooks; attaching each hinge hook to each receiver; aligning each of the securing receivers in the cover with the securing receivers in the main body; and attaching a securer through the aligned securing receivers. Using this method, the maximum number of securers and securing receivers may be as few as one.

The above method can further include the steps of mounting a clip or other snapping means on the cover; mounting a slot for receiving the clip on the main body; and clipping the clip into the slot. When these steps are included in the method, the maximum number of securers, and securing receivers may be as few as zero.

BRIEF DESCRIPTION OF THE DRAWINGS

FIG. 1 shows a bottom view of the cover, unattached to the main body.

FIG. 2 shows a side view of the hinge that is part of the cover, unattached to the hinge receiver of the main body.

DESCRIPTION OF THE PREFERRED EMBODIMENT

Figure 3:
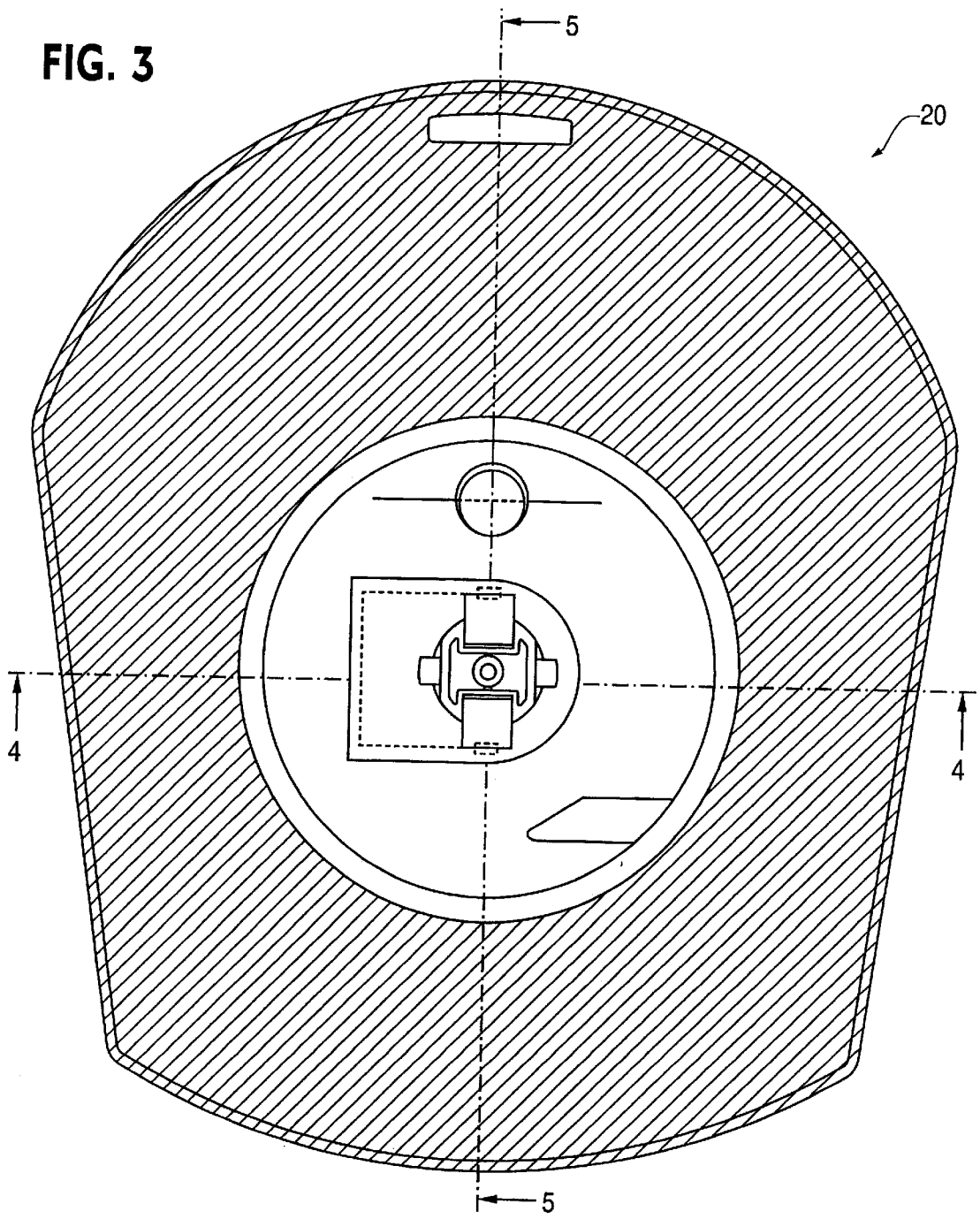
FIG. 3 shows a top view of the main body.
Figure 4:
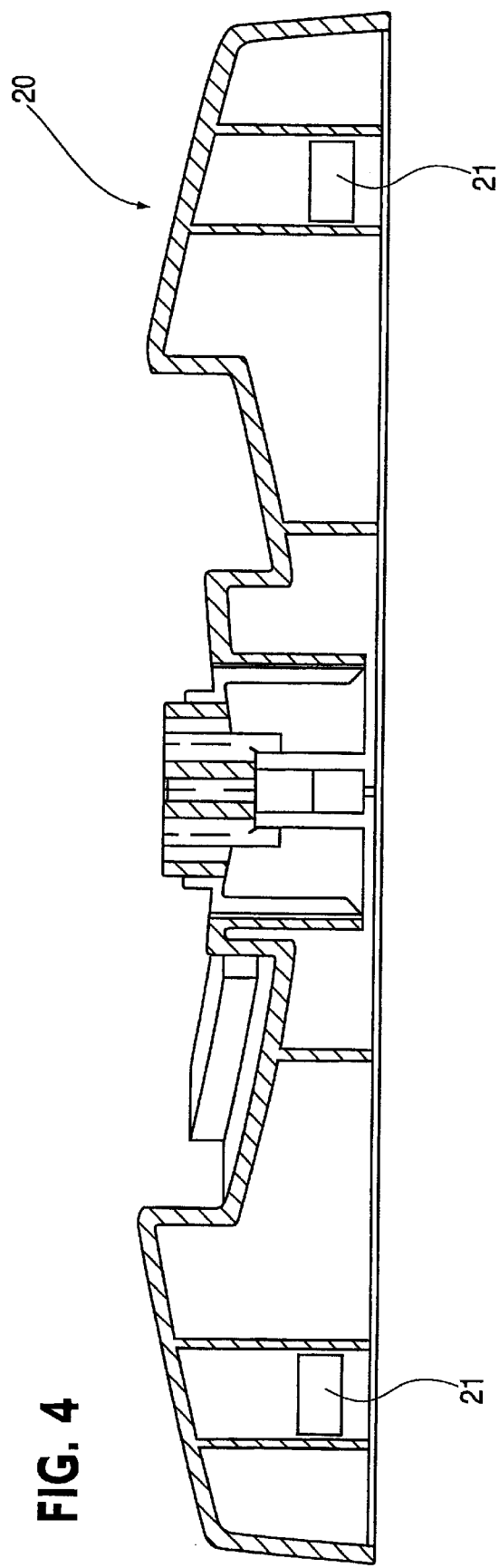
FIG. 4 shows a side cross sectional view of the main body, unattached to the cover.
Figure 5:
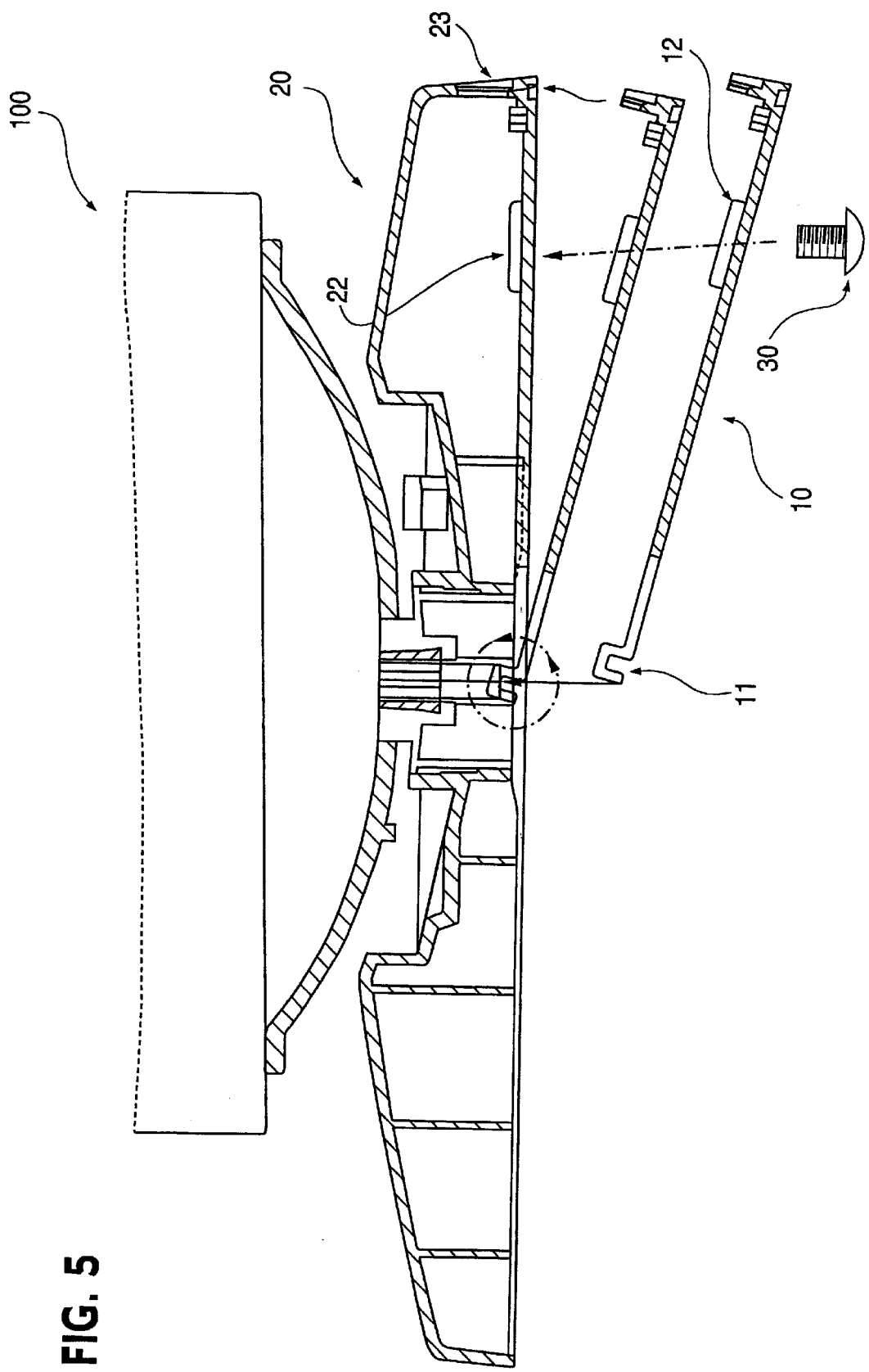
FIG. 5 shows a rear cross sectional view of the main body and the cover, attached to each other by the hinge and hinge receiver.

The above described needs are met by the housing and cover combination for protection and containment of electrical components, shown in cooperation in FIG. 5. A main body 20 is shown in FIG. 4, which, as set forth above, can be a plastic base stand for a computer monitor 100. The cover 10 is shown in FIG. 1, and has one or more hinge hooks 11. The hinge hook 11 is shown to be located on an outer edge 13 of a surface of the cover 10. However, the hinge hook 11 could be located on a surface of the cover 10 and serve the same purpose. Further, multiple hinge hooks 11 can be disposed laterally on the edge 13 of the cover 10, for example as shown in FIG. 1. Or, a single hinge hook 11 can be disposed centrally on the edge 13 of the cover 10 as shown in FIG. 5. In either case, the mechanism for utilizing the hinge hook 11 is the same.

The hinge hook 11 is shown in FIG. 2 at a side view. The hinge hook 11 is formed so that the cover is first attached to the main body 20 with the cover 10 at approximately a perpendicular angle to the main body 20, and then rotated approximately ninety degrees (see FIG. 5) to cover the void where electrical components are to be stored. The cover 10 has up to two securing receivers 12. The securing receivers 12 are basically bosses which may be shaped to accommodate any type of securer 30. Screws are typical securers 30, though many types of securers may be used.

The housing also includes a main body 20. It is in the main body 20 that the electrical components are to be enclosed and protected. The main body 20 can be, for example, a plastic base stand for a computer monitor. The main body 20 has up to two securing receivers 22, which also receive the securer 30. Again, the securing receivers 22 in the main body are basically bosses formed to accommodate which ever type of securer is used. The main body 20 also includes a receiver 21 for each of the hinge hooks 11. When the hinge hooks 11 are inserted into the hinge receivers 21, and the cover 10 is rotated against the main body 20, the securing receivers 12 in the cover 10 automatically align with the securing receivers 22 in the main body 20.

Because the hinge mechanism 11, 21 in the present invention provides a high amount of security and immobility of the cover 10 against the main body 20, the maximum number of screws 30 and bosses 12, 22 required to further secure the cover 10 are greatly reduced in comparison with the prior art. There can even be less than two screws and bosses to securely fasten the cover against the main body.

In another embodiment of the invention, a securing clip 14 is mounted on the cover 10. The securing clip may be mounted at an edge of the cover 10, or placed on a surface of the cover 10. The securing clip 14 is shown in FIGS. 1 and 5 at the edge of the cover 10. The securing clip 14 can be fastened in a slot 23 formed in the main body 20. When a clip 14 is used, the cover 10 is even more securely held against the main body 20, and the number of screw required to further fasten the cover 10 to the main body 20 can be one, or even zero. Other means for clipping, or snapping, the cover 10 against the main body 20 are not limited to the clip 11 and slot 21 shown in the drawings. Other mechanisms can be used to protect the electrical equipment to be housed within the main body 20.

Having described an embodiment of the invention, it is to be understood that the invention is not limited to any of the precise embodiments described herein. Various changes and modifications could be effected by one skilled in the art without departing from the spirit or scope of the invention as defined in the appended claims.

What is claimed is:

1. A housing for protection and containment of electrical components, comprising:
   a computer monitor;
   a cover, comprising at least one hinge hook, and no more than two first securing receivers, wherein each of said at least one hinge hook is located on an outer edge of a surface of said cover;
   a base stand upon which said computer monitor is detachably mounted, comprising no more than two second securing receivers, and at least one receiver, wherein each of said at least one receiver receives each of said at least one hinge hook; and
   no more than two securers, received by said first and second securing receivers.

2. A housing as set forth in claim 1, wherein the maximum number of securers is one, the maximum number of first securing receivers is one, and the maximum number of second securing receivers is one.

3. A housing as set forth in claim 1, wherein each of said securers is a screw, and each of said first and second securing receivers is a boss.

4. The housing set forth in claim 1, further comprising a securing clip, mounted on said cover, and fastenable in a slot formed in said base stand.

5. The housing as set forth in claim 1, further comprising means for snapping said cover against said base stand.

6. A housing for protection and containment of electrical components, comprising:
   a computer monitor;
   a cover, comprising at least one hinge hook;
   a base stand upon which said computer monitor is mounted, comprising at least one receiver, each of said at least one receiver receives each of said at least one hinge hook, and a slot which has an opening; and
   a securing clip, mounted on a surface of said cover, and fastenable in said slot, wherein a distal end and a main body portion of said securing clip are pinched and frictionally held against a gravitational force by said slot.

7. A housing as claimed in claim 6, wherein said securing clip perpendicularly extends from said surface of said cover.

8. A housing as claimed in claim 6, wherein each of said at least one hinge hook has a u-shaped portion that is received by each of said at least one receiver with said cover being disposed approximately perpendicular to a bottom surface of said base stand.

9. A housing as claimed in claim 8, wherein said cover is rotated approximately ninety degrees to make said cover coplanar with said bottom surface of said base stand in order to have said at least one hinge hook received by said at least one receiver, and said securing clip fastened in said slot.

10. A housing as claimed in claim 6, wherein said cover further comprises no more than two first securing receivers, said base stand further comprises no more than two second securing receivers, and said housing further comprises no more than two securers, received by said first and second securing receivers.

11. A housing as set forth in claim 10, wherein the maximum number of securers is one, the maximum number of first securing receivers is one, and the maximum number of second securing receivers is one.

12. A housing as set forth in claim 10, wherein each of said securers is a screw, and each of said first and second securing receivers is a boss.

13. The housing as set forth in claim 6, wherein each of said at least one hinge hook is located on an outer edge of a surface of said cover.

* * * * *